United States Patent [19]

Harrison

[11] 4,202,377
[45] May 13, 1980

[54] PIPE CLEANING AND PLUGGING APPARATUS

[75] Inventor: George W. Harrison, Alvin, Tex.

[73] Assignee: Team, Inc., Alvin, Tex.

[21] Appl. No.: 957,409

[22] Filed: Nov. 3, 1978

Related U.S. Application Data

[63] Continuation of Ser. No. 685,351, May 11, 1976, abandoned.

[51] Int. Cl.² .................................................. F16L 55/12
[52] U.S. Cl. ..................................... 138/94; 15/104.05; 15/104.06 R
[58] Field of Search ........................... 138/89, 93, 94; 15/104.1 R, 104.06 R, 104.05, 104.06 A; 4/DIG. 7

[56] References Cited

U.S. PATENT DOCUMENTS

| | | | |
|---|---|---|---|
| 49,416 | 8/1865 | Keener | 15/104.1 R |
| 343,769 | 6/1886 | Levi | 15/104.1 R |
| 738,289 | 9/1903 | Buckley | 4/DIG. 7 |
| 979,121 | 12/1910 | Baker | 15/104.1 R X |
| 1,060,163 | 4/1913 | Casaday | 15/104.1 R |
| 1,623,843 | 4/1927 | Klinck | 138/89 |
| 1,683,429 | 9/1928 | Walker | 15/104.06 R |
| 1,741,899 | 12/1929 | Zuckweiler | 4/DIG. 7 |
| 1,747,933 | 2/1930 | Goodman et al. | 138/94 |
| 2,285,779 | 6/1942 | Mueller et al. | 138/94 |
| 2,450,486 | 10/1948 | Perry | 15/104.1 R X |
| 3,115,163 | 12/1963 | Van Epps et al. | 138/94 |
| 3,120,246 | 2/1964 | Alter | 138/94 |
| 3,619,844 | 11/1971 | Collins et al. | 15/104.06 R |
| 3,665,966 | 5/1972 | Ver Nooy | 138/94 |
| 4,040,450 | 8/1977 | Boundy | 138/96 |

FOREIGN PATENT DOCUMENTS 960635  6/1964  United Kingdom ..................... 138/94

Primary Examiner—Richard E. Aegerter
Assistant Examiner—James E. Bryant, III
Attorney, Agent, or Firm—Guy E. Matthews

[57] ABSTRACT

An apparatus for plugging a pipeline through a side opening and arranged such that the sealing portion may be removed and a rotary brush substituted to effect initial cleaning of pipeline should that be desired. The apparatus includes a bell-type housing which is arranged for mounting over the side opening in a pipeline to form a fluid tight chamber therewith so that the cleaning and plugging operation can be carried out while fluid pressure is present in the pipeline. The apparatus includes a drive stem which extends into the chamber through a ball and socket coupling provided in the upper part of the housing which permits articulation of the drive stem. The drive stem has supported on the lower end thereof a plug assembly which is adapted for insertion into the pipeline for effecting the seal. The plug assembly includes an annular cup-shaped seal having an annular lip which is sized for easy insertion into the pipeline at a point axially adjacent to the side opening. The plug assembly includes an annular member which is arranged to deflect the lip portion of the seal radially outwardly into initial sealing engagement with the pipe upon contact of the annular member therewith. Being cup-shaped, the seal member is thereafter self-energized by fluid pressure in the pipeline. Hence, the seal may be undersized with respect to the inside diameter of the pipe so as to be readily positioned therein and yet can be urged to the sealing position by operation of the tool. The tool of this invention is easily adaptable to become a pipe-cleaning tool in that the seal can be readily removed and an annular brush mounted on the tool to accomplish cleaning of the pipe initially should that be required at the point where the sealing plug is to be installed.

4 Claims, 6 Drawing Figures

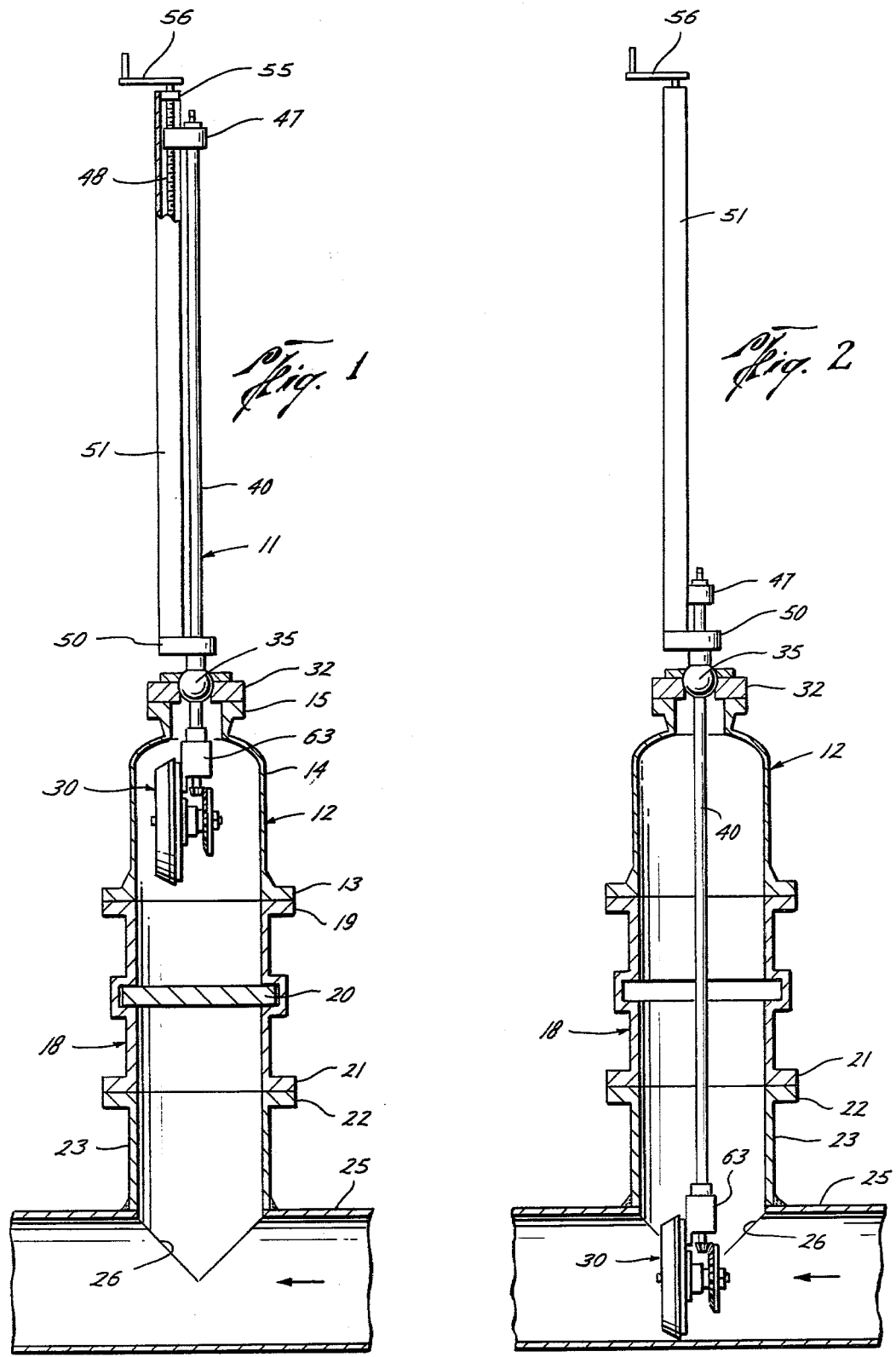

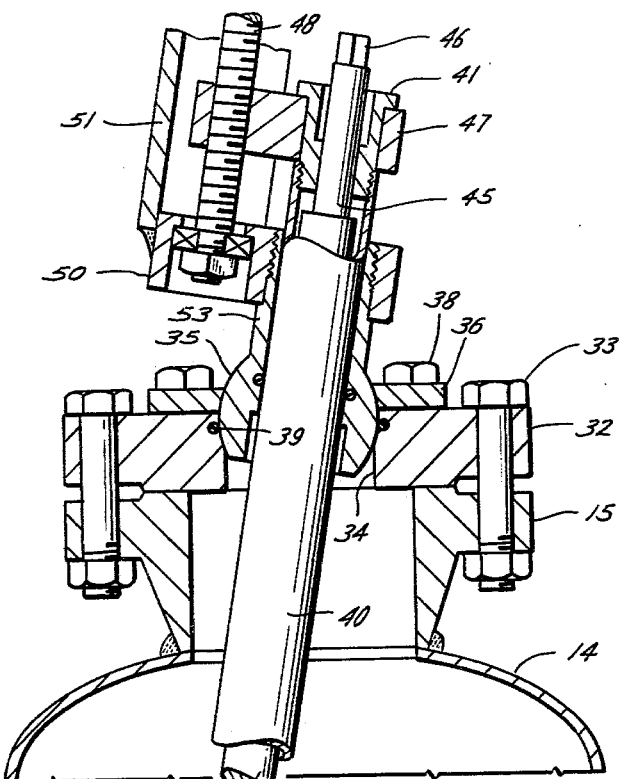
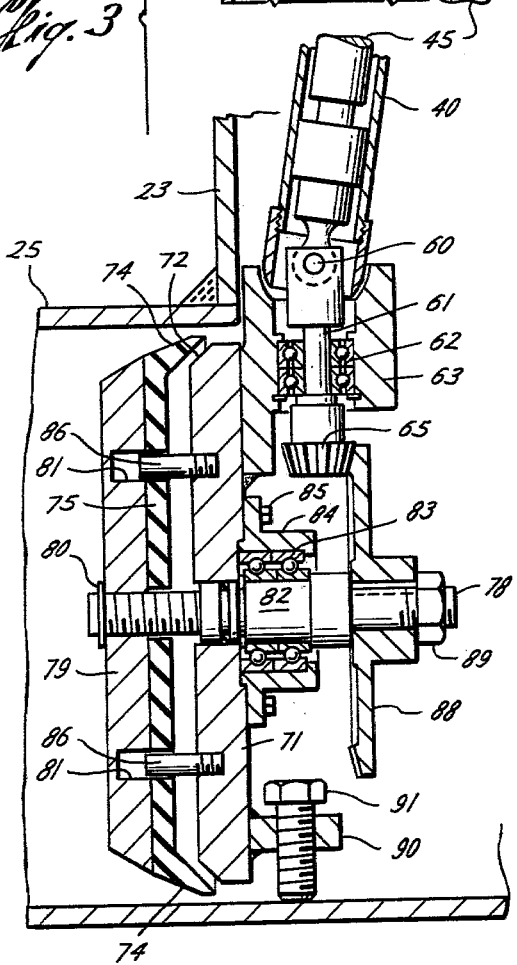
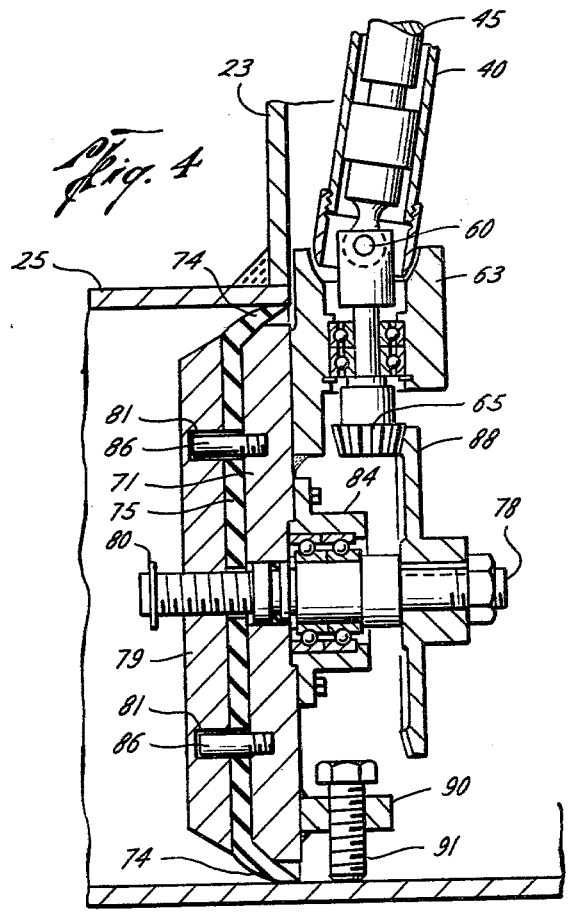

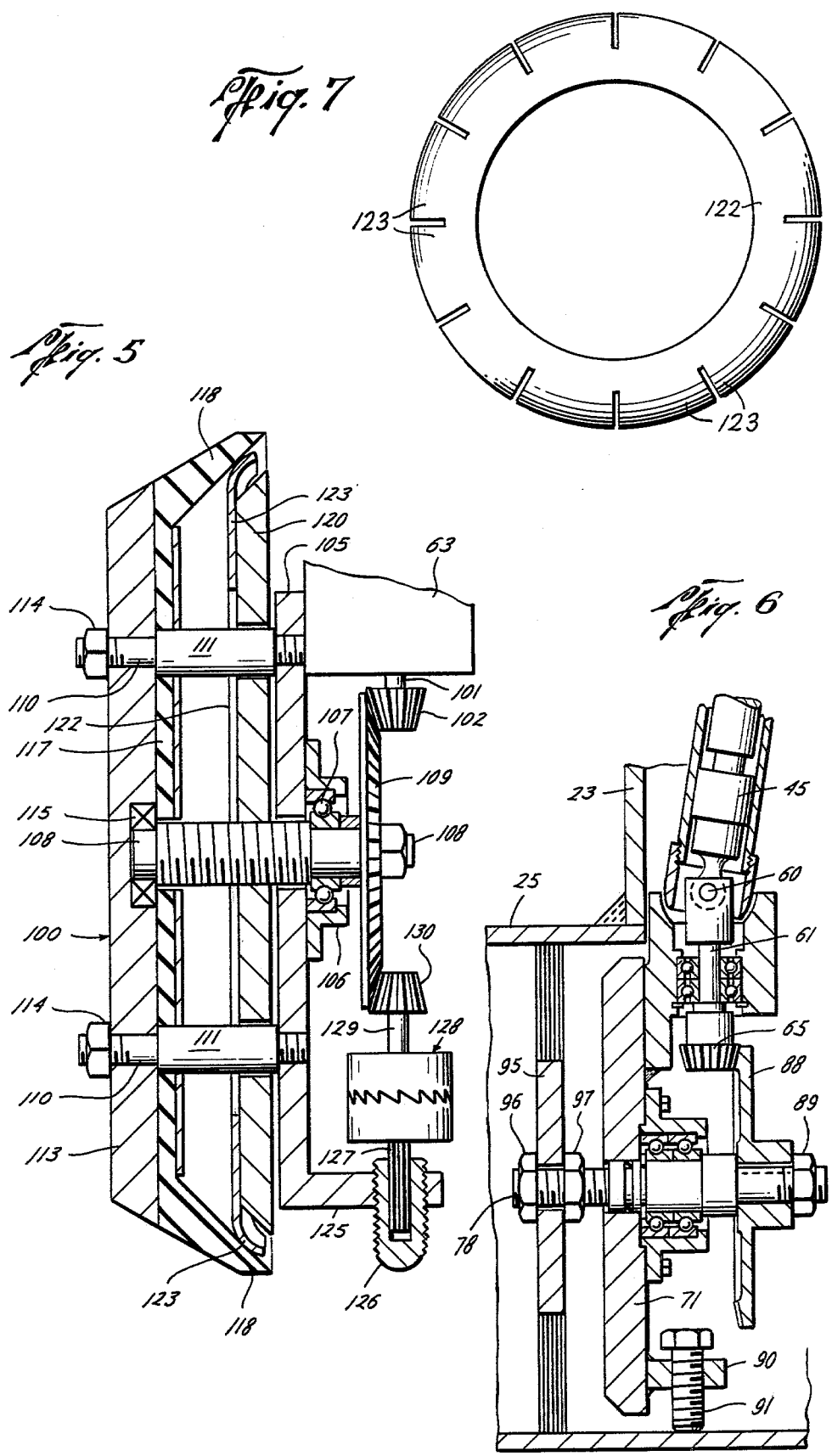

PIPE CLEANING AND PLUGGING APPARATUS

This is a continuation of application, Ser. No. 685,351, filed May 11, 1976, by George W. Harrison, now abandoned.

BACKGROUND OF THE INVENTION (a) Field of the Invention

This invention relates to pipeline cleaning and plugging apparatus of the type which can be inserted into the pipeline through a side opening therein to clean and/or plug the same while the pipeline is pressurized.

(b) Description of the Prior Art

Many prior art devices have been developed for plugging a pipeline through a side opening while the pipeline is transmitting fluid or otherwise contains pressurized fluid. However, none of the prior art apparatus are fully successful for various reasons. Under certain conditions, the internal surface of a pipeline to be plugged may not be a uniform circle, having been deformed or having been obstructed by deposits, such as corrosion, or the like thereon. When this occurs, it is difficult to effect plugging thereof with prior art tools. Moreover, such prior art tools are deficient in that they lack means for adjusting the plugging head of the tool so as to accommodate variations in pipe diameters so as to co-axially or centrally position the seal means initially and to give added support to the plug assembly during the inserting operation. None of the prior art tools are easily adaptable to change them into a pipe cleaning tool so as to clean the internal surface of the pipe where the plug is to be made.

SUMMARY OF THE INVENTION

It is therefore an object of this invention to provide an improved pipe cleaning and plugging apparatus which will overcome the aforesaid shortcomings of the prior art.

Briefly stated, the apparatus of this invention is for plugging a pipeline, as for example, through a side opening in such a pipeline. It includes a drive shaft assembly adapted for having the lower end thereof inserted into the pipeline. A plug assembly is attached to the lower end of the drive shaft assembly. The plug assembly includes an annular seal having a circumferential lip portion arranged for sealing engagement with the inside surface of the pipe upon radially outward deflection thereof. The plug assembly has means axially spaced from the lip portion of the seal for deflecting the lip portion radially outwardly into sealing engagement with the pipe upon contact therewith. The plug assembly also includes means for urging the lip portion and the contacting means axially together as aforesaid, in response to operation of the drive shaft assembly, to thereby plug the pipeline.

The seal is preferably in the form of a cup-shaped seal with the lip portion thereof facing upstream relative to the flow of fluid in the pipe. In certain embodiments, the deflecting means may include a plurality of generally radially extending resilient fingers arranged to contact and deflect the lip as stated above.

The apparatus of this invention includes various other novel features which are listed hereinafter and/or in the description and claims which follow. Certain of the novel features include an adjustable foot means connected to the plug assembly for contacting the internal surface of the pipeline to assist in co-axially aligning the plug assembly. Another novel feature includes the ball and socket connection of the drive stem to the housing so as to permit articulation of the drive stem and yet maintain a fluid-type seal. Another novel aspect includes means for driving the drive stem in and out of the housing while maintaining the articulation capability discussed above and while maintaining a sealed housing.

BRIEF DESCRIPTION OF THE DRAWINGS

FIG. 1 is a generally central sectional view of the pipe in which the plugging unit of this invention is shown in the initially mounted position.

FIG. 2 is a central sectional view generally similar to FIG. 1 but showing the plugging portion of the apparatus of this invention moved to near the plugging position.

FIG. 3 is a fragmented central sectional view showing the plugging apparatus of this invention positioned just immediately prior to the final actuation step.

FIG. 4 is a partial view similar to FIG. 3 but showing the plugging body of the apparatus of this invention in the set position.

FIG. 5 is a central sectional view of an alternative plugging body of this invention.

FIG. 6 is a central sectional view of the apparatus of this invention adapted for performing a pipe cleaning operation.

DESCRIPTION OF THE PREFERRED EMBODIMENT

Referring now to the drawings and in particular to FIG. 1 initially, the apparatus of this invention is generally designated by the numeral 11 and for purposes of convenience will be referred to as plugging tool 11. The lower end of plugging tool 11 is comprised of a housing generally designated by the numeral 12 which in turn is comprised of a lower flange 13, a housing bell 14, and an upper flange 15. Housing 12 is shown mounted on a valve stool generally designated by the numeral 18 which in turn is comprised of upper flange 19 which is shown bolted or otherwise attached to flange 13, a full opening gate valve 20, and lower flange 21.

Flange 21 is shown as bolted or otherwise attached to flange 22 of riser pipe 23 which is welded to pipe 25, which in this instance will be the pipe that will be plugged by the apparatus of this invention.

It is to be understood that in making what is commonly referred to as a "hot tap," it is a conventional practice to weld a riser pipe such as riser pipe 23 to pipe 25 in the manner shown and to thereafter remove a coupon from the side of pipe 25 to provide side opening 26 therethrough without the loss of fluid pressure from pipe 25. This manner of making a "hot tap" is quite old in the art and need not be described here since it is not part of the present invention. At such time as it becomes desirable to carry out the plugging operation for which the present invention is adapted, then it is understood that valve 20 would be placed in the closed position or would be retained in the closed position and housing 12 attached to flange 19 in the manner shown. The apparatus of this invention also includes a plug assembly generally designated by the numeral 30, the details of which will be provided hereinafter.

The top end of housing 12 is closed by lower ball joint flange 32 which is connected to flange 15 by a plurality of stud bolts 33. Flange 32 is provided with a central opening 34 therethrough, the upper end of which is enlarged radially outwardly with a spherical shaped portion to provide a ball seat for receiving ball 35 therein. Ball 35 is retained in place by upper ball joint flange 36 which has a central aperture therethrough, which aperture is curved to engage and retain ball 35 therein as best shown in FIG. 3. Flange 36 is held in place by a plurality of bolts 38. It is to be understood that flange 32 may be provided with appropriate seal means, such as seal 39, to insure that housing 12 is fluid tight.

Ball 35 has sealingly and slidingly positioned therein drive stem 40 which extends downwardly in housing 12 and has generally supported on the lower end thereof plug assembly 30 which will be described hereinafter. Drive stem 40 is generally tubular in figuration and has the upper end thereof closed by retainer ring 41 which is threadably engaged therewith and which has an axial bore therethrough in which is mounted a rotatable drive shaft 45. The upper end of drive shaft 45 is provided with a square portion 46 which is arranged for receiving a wrench or crank thereon to effect rotational movement of drive shaft 45. Retainer ring 41 is connected to laterally extending stem driver 47 which is threadably connected to drive screw 48, the lower end of which is journaled for rotation in lower end piece 50 of elongated support 51 which is generally C-shaped in cross section and has drive screw 48 centrally positioned therein. Lower end piece 50 is threadably mounted on sub 53 which is connected to ball 35 as best seen in FIG. 3.

As best seen in FIG. 1, the upper end of elongated support 51 has a top plate 55 which has a central aperture therethrough for rotatingly receiving the upper end of drive screw 48 for rotation therein. The upper end of drive screw 48 has attached therewith a crank 56 for effecting rotation thereof as desired. Hence, upon rotation of crank 56 as shown in FIG. 1, stem driver 47 is advanced downwardly by drive screw 48 until it reaches the lowermost position such as is shown in FIG. 2, at which point plug assembly 30 is generally centrally positioned in pipe 25. It is to be understood that drive stem 40 may have appropriate seals spaced between it and the internal surface of ball 35 and sub 53 to provide a fluid tight seal.

Referring now in particular to FIGS. 3 and 4, the lower end of drive shaft 45 is mounted for rotation in drive stem 40 and has attached to the lower end thereof a universal joint 60, the lower end of which is attached to pinion shaft 61 which is supported by ball bearings 62 for rotation in pinion support 63. The lower end of pinion shaft 61 has mounted thereon for rotation therewith pinion gear 65.

In operation of those portions of the tool thus far described, let it be assumed that gate valve 20 is fully closed thereby confining the fluid pressure present in pipeline 25. Housing 12 is then connected by flange 13 to flange 19 of valve stool 18, thus sealing the connection as shown in FIG. 1. Gate valve 20 is then opened admitting pressure to housing 12. Drive stem 40 is then forced downwardly into housing 12 by rotating crank 56 until the position shown in FIG. 2 is reached. Then by operation of the elongated support 51, drive stem 40 is manually rotated out of the perpendicular position to the angular position generally shown in FIG. 3, with the result that a portion of plug assembly 30 is inserted into a portion of pipe 25 which is axially spaced from opening 26 where a riser pipe 23 is connected thereto. The positioning of plug assembly 30 in this manner is facilitated by the fixed attachment thereof to drive stem 40 at an angle of approximately 9° as shown in FIG. 3. With the sealing arrangement provided with ball 35 as discussed above, the tool of this invention can be operated on high pressure lines.

Referring now in particular to FIGS. 3 and 4, plug assembly 30 will be described in greater detail. Pinion support 63 has attached (by welding or the like) to the forward or left side thereof as viewed in FIG. 3, fixed angular back plate 71, which plate is provided with a beveled surface 72 around the forward peripheral surface thereof. Surface 72 is shown positioned generally axially adjacent to annular lip 74 of generally cup-shaped elastomeric seal 75, which is shown slidably supported on rotatable shaft 78. Seal 75 has mounted adjacent thereto for supporting the same an annular movable plate 79 which is threadably mounted on shaft 78 for axial movement thereon when shaft 78 is rotated. A retaining washer 80 is mounted on the end of shaft 78 to prevent plate 79 from being rotated off of the end of shaft 78.

The right side of plate 79 is provided with two axially extending counter bores 81, each of which is adapted to slidingly receive a guide pin 86, the opposite ends of which are threadably engaged with plate 71. Pins 86 prevent the rotation of plate 79 and seal 75 about shaft 78 during rotation thereof.

Portion 82 of shaft 78 is somewhat enlarged and is provided with a smooth cylindrical surface for rotation in bearing 83 which is retained in bearing housing 84 which is attached to the rearward side of fixed plate 71, as shown, by bolts 85. The right end of shaft 78, as viewed in FIGS. 3 and 4, has mounted thereon beveled gear 88 which is arranged for engagement with and rotation by pinion gear 65. Beveled gear 88 is retained in place by nut 89 threadably mounted on the end of shaft 78.

With the tool positioned as shown in FIG. 3, portion 46 of drive stem 40 is then rotated by a wrench, crank, or the like to cause rotation of drive shaft 45, which causes movable plate 79 to move axially on shaft 78 toward back plate 71. This movement is continued until bevel surface 72 of base plate 71 contacts lip 74 of seal 75, thereby deflecting lip 74 into sealing contact with the internal surface of pipe 25 as shown in FIG. 4. Once such a seal has been effected, seal 75 is self-energizing by virtue of the pressure in pipe 25 to the right thereof as shown in FIGS. 3 and 4, it being assumed that fluid flows from the right to the left, as shown by the arrows in pipeline 25 in FIGS. 1 and 2.

In order to effect proper positioning of plug assembly 30 in pipe 25, as shown in FIGS. 3 and 4, the same is provided with adjustable foot means in the form of a lug 90 attached to the lower rearward side of back plate 71, which lug supports and has threadably mounted therein stop bolt 91, the lower end of which is arranged to contact the bottom of the inside surface of pipe 25 as shown. Because various size pipes vary in internal diameter, stop bolt 91 is adjusted prior to operation of the tool such that it will centrally position back plate 71 generally concentric with respect to pipe 25 and to give added support to plug assembly 30 to prevent fluid pressure in pipe 25 from improperly deflecting the position of plug assembly 30 prior to the sealing operation.

When it becomes desirable to remove plug assembly 30, the operations are generally reversed from those just discussed. In this instance, drive stem 45 is rotated in the opposite direction, which causes plate 79 to be moved axially away from back plate 71 such that bevel surface 72 is no longer engaging lip 74. Thereafter, by manipulating support 51, plug assembly 30 may be withdrawn from the sealing position shown in FIG. 4 and raised into housing 12 by turning of crank 56 in the opposite direction, as previously described, until plug assembly 30 is returned to the position shown in FIG. 1. Thereafter valve 20 may be closed and housing 12 removed to complete the plugging operation.

In certain circumstances the inside surface of pipe 25 where the plug is to be inserted and the seal made may be corroded or otherwise have a built-up surface which will prevent either the insertion of plug assembly 70 or which will prevent effecting a proper seal therewith. In such instances, it is desirable to have a tool which can easily and quickly remove such obstructions from the internal surface of pipe 25. The apparatus of this tool is easily adapted to carry out such cleaning operations and one such adaptation is shown in FIG. 6. The tool of this invention is adapted to become a cleaning tool by simply removing washer 80, plate 79, seal 75, and bolt 86 from the tool. In their places, there is substituted as shown in FIG. 6 an angular rotatable wire brush 95 which is mounted on shaft 78 and held in place by a pair of washers 96 and 97. Thus changed, the lower portion of the tool is then inserted into pipeline 25 in the manner shown in FIG. 6 and a power wrench applied to portion 46 of drive shaft 45 to rotate drive shaft 45 at a high rate of speed on the order of several hundred RPMs. Such rotation causes rapid rotation of brush 95 which is arranged to contact and clean the internal surface of pipe 25. Brush 95 is adapted for cleaning along an axial portion of pipe 25 by manipulation of drive stem 40. When the cleaning operation has been completed, the tool as thus modified is withdrawn in the same manner as described with the tool when it is adapted for plugging purposes. It will thus be observed that the apparatus of this invention is readily adaptable for not only cleaning the internal surface of a pipe prior to effecting a plugging thereof but for easily effecting the plugging as discussed above.

Referring now to FIG. 5, an alternate embodiment of a plug assembly of this invention is generally designated by the numeral 100. Plug assembly 100 is shown supported on the lower end of pinion support 63 which is the same support shown in the prior embodiment and which in turn is connected to drive shaft means and so forth in the same fashion as with the prior embodiment and therefore will not be re-described. Pinion support 63 has depending therefrom pinion shaft 101 which supports pinion gear 102 on the lower end thereof. It is to be understood that gear 102 corresponds with pinion gear 65 of the previous embodiment and is operated in the same fashion.

Pinion support 63 is also attached by welding or the like to support plate 105 which is generally annular in shape and somewhat smaller in diameter than the pipe which is to be plugged. Plate 105 has mounted on the rearward side thereof bearing housing 106 which has mounted therein ball bearing 107 which supports shaft 108 for rotation therein. Shaft 108 has mounted on the right end thereof for rotation therewith beveled gear 109 which is arranged for engagement with and rotation by pinion gear 102.

Plate 105 has threaded into the forward side thereof a plurality of circumferentially spaced bolts 110, each of which has mounted thereon a tubular sleeve 111, the end of which is arranged to abut against fixed support plate 113. Plate 113 has appropriate holes therein to receive bolts 110 and is held in place by nuts 114. It will be observed that support plate 113 is generally fixed with respect to plate 105.

The forward or left end of shaft 108 is supported for rotation in plate 113 by means of thrust bearing 115. Support plate 113 also has mounted axially adjacent thereto and supplied support thereto an annular elastomeric cup type seal 117 which is generally similar to seal 75 of the previous embodiment and which has an annular lip 118 which is generally similar to lip 74 of the prior embodiment.

Shaft 108 has threadably mounted thereon an axially movable plate 120 which is spaced between plates 105 and 113. Plate 120 is provided with appropriate holes for receiving therein sleeves 111 for sliding movement relative thereto. Plate 120 has mounted axially adjacent thereto and on the forward side thereof, as viewed in FIG. 5, grip seal expansion means in the form of an annular disc 122 which has a plurality of resilient curved expansion fingers 123 about the periphery thereof arranged for contacting and deflecting lip 118 when movable plate 120 is advanced toward support plate 113. Such axial movement is accomplished by rotation of shaft 108 by turning pinion gear 102 in the fashion previously described with the prior embodiment. Rotation of shaft 108 causes axial movement of movable plate 120 and hence disc 122 and expansion fingers 123 toward seal 117 and lip 118 with the result that lip 118 is deflected out into contact with the internal surface of the pipe which is being plugged, as with the prior embodiment. The advantage of this embodiment is that the expansion fingers 123 are quite resilient and therefore can accomodate greater irregularity in the internal surface of the pipe being plugged. Such internal variations might arise because the pipe has been damaged or mashed or has been improperly or poorly manufactured. Nevertheless, this embodiment of the invention permits sealing and therefore plugging of such pipe regardless of such irregularities.

The lower end of plate 105 has attached therewith a lug 125 which has threadably mounted therein and depending therefrom extendable foot 126 which is attached for rotation to shaft 127 which has supported thereon a conventional rachet type spring-loaded slip clutch 128, the upper end of which supports for rotation therewith pinion shaft 129 which has mounted thereon for rotation therewith pinion gear 130 which is also arranged for engagement with and turning by beveled gear 109. It is to be understood that rachet clutch 128 is of conventional design and is arranged such that upon appropriate rotation of pinion 130, foot 126 is moved downwardly to the point that contact is made with the bottom of the pipe being plugged. Such contact prevents further downward movement of foot 126 because of the one-way operation of clutch 128. However, upon rotation of pinion gear 130 in the opposite direction, which occurs in the removal of plug assembly 100, clutch 128 causes foot 126 to be retracted, thereby facilitating withdrawal of plug assembly 100.

When it becomes desirable to withdraw plug assembly 100, the heretofore described operations are reversed and pinion gear 102 is rotated in the reverse direction, which thereby moves movable plate 120 axially toward plate 105 which permits disc 122 to move likewise thereby disengaging fingers 123 from seal lip 118. Such rotation also retracts extendable foot 126 as explained above, at which point the entire plug assembly 100 can be easily removed. Another of the advantages of this embodiment is that there is provided a positive extendable foot 126 to give added support for plugging assembly 100 and which can accommodate variations in pipe dimensions. Moreover, foot 126 is positively withdrawn from engagement during the removal operations to further facilitate removal of the tool from the plugged position.

It will thus be observed that this invention provides the art with an improved cleaning and plugging apparatus which is arranged to effect plugging of pipe which might otherwise not be plugged by conventional prior art tools.

Further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. An apparatus for plugging a fluid carrying pipeline through a side opening therein, the combination comprising:
    a drive shaft assembly adapted for having the lower end thereof inserted into said pipeline through said side opening;
    a plug assembly attached to said lower end of said drive shaft assembly,
    said plug assembly including an annular seal having a circumferential lip portion arranged for sealing engagement with the inside surface of said pipeline upon radially outward deflection thereof.

2. The invention as claimed in claim 1 including:
    clutch means interposed in said drive means for limiting said driving action during insertion of said plug assembly and for withdrawing said foot means when said plug assembly is removed from said pipe.

3. In an apparatus for plugging a fluid carrying pipeline through a side opening therein, the combination comprising:
    a drive shaft assembly adapted for having its lower end inserted into said pipeline through said side opening;
    a plug assembly attached to said lower end of said drive shaft assembly;
    said plug assembly including an elastomeric cup-shaped seal having a circumferential lip portion arranged for sealing engagement with the inside surface of said pipeline upon radial outward deflection thereof;
    said plug assembly also including means axially spaced from said lip portion of said seal for deflecting said lip portion radially outward into sealing engagement with said pipeline upon contact therewith, said seal and said deflecting means thereby forming a plug; and
    said plug assembly including means for urging said lip portion and said deflecting means axially together in response to operation of said drive shaft assembly which plugs said pipeline; and
    adjustable foot means connected to the side of said plug assembly opposite from said seal for frictionally contacting the internal surface of said pipeline at a point generally opposite from said side opening to thereby co-axially support said plug assembly in said pipeline, said foot means being adjusted in response to operation of said drive shaft assembly while said seal means are inside said pipeline; and
    means operable in response to operation of said urging means for driving said adjustable foot means into contact with said pipeline as aforesaid.

4. The invention as claimed in claim 3 including:
    clutch means interposed in said drive means for limiting said driving action during insertion of said plug assembly and for withdrawing said foot means when said plug assembly is removed from said pipe.

* * * * *